Oct. 16, 1934.  A. E. DUNSTAN ET AL  1,976,717
TREATMENT OF HYDROCARBON GASES

Filed July 6, 1928

Inventors
A. E. Dunstan
R. V. Wheeler
by
W. E. E——
Attorney.

Patented Oct. 16, 1934

1,976,717

UNITED STATES PATENT OFFICE 1,976,717

TREATMENT OF HYDROCARBON GASES

Albert Ernest Dunstan, London, and Richard Vernon Wheeler, Sheffield, England, assignors, by mesne assignments, to Gasoline Products Company Incorporated, a corporation of Delaware Application July 6, 1928, Serial No. 290,736
In Great Britain October 8, 1927

18 Claims. (Cl. 196—10)

This invention relates to the treatment of gases such as natural gases, gases from cracking plants, wild gases from stills, gases from retorts employed for the low temperature carbonization of solid carbonaceous substances such as coal, and generally to the treatment of gases containing gaseous paraffins.

The invention has among its objects to secure a high yield of aromatic bodies in a simple thermal treatment of such gases and under conditions in which the production of free carbon is minimized, and to produce a residual gas that may be utilized for the production of carbon black, or for the production of other organic bodies such as oxygenated derivatives of the hydrocarbons, for example, alcohols, aldehydes, ketones, organic acids, and the like.

According to the invention such a gas is gradually heated in its course through pipes or conduits to a degree substantially below that at which eventual decomposition of the content of gaseous paraffins is to be carried out on the issue of the gas into reaction tubes, conduits or passages, within which the gas is further heated at a temperature within a determined range and for a determined time according to the composition of the gas treated. Thus the treatment comprises the application of heat to the gas under conditions that are determinate with respect to temperature and time factor, it being understood that the length, size and form of the tubes, conduits or passages are such in relation to velocity of the gas in the treatment that the necessary turbulence and time contact are maintained and substantial uniformity of temperature of the gas ensured.

According to the invention moreover, the velocity of the gas is substantially and suddenly reduced on issue from the reaction tubes, conduits or passages, as for example by the provision of an expansion box or casing of large volume in relation to that of the reaction tubes into which the treated gas is discharged and in which it is suddenly cooled and the deposition of free carbon is facilitated within the expansion box or casing and the tendency to carbon deposition within the reaction tubes reduced or avoided, the gas thence passing on for further treatment, and the residual gas may be utilized for example in the manufacture of carbon black or other organic bodies.

According to the invention moreover, the treatment may be carried out in the presence of steam, that is to say, steam may be admixed with the gas prior to or during its treatment. The steam used may thus be admitted with the gas on its entry into the preheater, or as is preferred the steam may be admitted at or near the inlet end of the reaction tubes, and the steam is advantageously superheated before its admission into the stream of gas. By such means the reactions are facilitated, the yield of liquid and gaseous products increased and the production of free carbon minimized, while a residual gas results that may contain carbon monoxide and hydrogen and that may be used for the production of other organic bodies such as oxygenated derivatives of the hydrocarbons for example alcohols, aldehydes, ketones, organic acids and the like.

According to the invention moreover, the gas after once being treated and deprived of tar and other condensible bodies may be again subjected to thermal treatment, or part of the treated gas after being deprived of condensible bodies may be re-cycled through the plant.

According to the invention moreover, if the gas treated consist mainly or almost entirely of methane, heat is applied within the reaction tube at a temperature of about 950° C., (or within a range of approximately from 850° to 975° C.), and similarly if the gas to be treated consist mainly or almost entirely of other gaseous paraffins the temperature is determined accordingly, in order to secure correspondingly high yields of aromatic bodies by the treatment. Thus if the gas to be treated consist mainly or almost entirely of ethane, propane, butane or pentane the approximate range of temperature in the application of heat within the reaction tubes, conduits or passages is respectively as follows: Ethane,—800 to 900° C., propane,—750 to 850° C., butane,—700 to 800° C., and pentane,—650 to 750° C.; it being understood that if the gas to be treated contain mixtures of such hydrocarbons, the temperature applied within the reaction tubes substantially corresponds to the average range of temperature of the respective constituents, and according to the proportions thereof. It will be understood that the temperatures immediately before and hereinafter indicated as relating to the heat applied within the reaction tubes are about the respective final temperatures to which the gas is to be subjected on flowing through the reaction tubes, the wall temperatures of the reaction tubes being correspondingly higher.

From the foregoing it will be seen that the optimum reaction temperature for a mixture containing any two or more of the above mentioned hydrocarbon gases may be mathematically determined by multiplying the amounts (in any given units) of each gas of the mixture by the optimum temperature for each particular gas, then adding the several results, and dividing the resulting sum by the sum of the amounts (in said units) of the said gases. The latter resulting figure will be substantially the optimum temperature for treatment of the particular gaseous mixture in question. For example, in computing the substantial optimum temperature condition for a gaseous mixture comprising, or containing, ethane, propane and butane, the following formula may be employed: Let A, B and C represent, respectively, the amounts (in any units) of ethane, propane and butane present in the gaseous mixture. Then the desired temperature will not vary more than 50° C. from a temperature of T (° C.) as substantially defined by the relation T (° C.) equals $$(A \times 850° C. + B \times 800° C. + C \times 750° C.) / (A+B+C).$$

According to the invention moreover, where the gas to be treated is rich in hydrogen sulphide the gas may be treated for the removal of sulphur by any known method, such as by limited oxidation with air or sulphur dioxide at about from 250° to 300° C. whereby elemental sulphur may be recovered before the gas is subjected to pyrolysis under the conditions described, the gas however being first stripped of any condensible or normally liquid hydrocarbons it may carry before subjection to pyrolysis.

The invention comprises the features of method and apparatus which are hereinafter described.

The invention is diagrammatically illustrated by way of example in the accompanying drawing in which:—

In carrying the invention into effect as illustrated in the accompanying drawing the gas to be treated may be passed through the plant by means of a rotary pump or compressor $a$. The gas may pass through a sealing pot $b$ and thence through a preheater $c$, and thence through the reaction tubes $d$ after first being admixed with preheated steam admitted at $c^2$.

The preheater and the reaction tubes are respectively mounted within a furnace setting $c^1$, $d^1$, whereby heat may be applied so that the gas to be treated in its passage in substantially parallel streams through the preheater, may be gradually heated substantially below the range of temperature at which decomposition is carried out in the reaction tubes, and whereby the gas streams in thence passing in parallel through the respective reaction tubes may be heated to such an extent that decomposition of the gas may take place under the conditions described.

The preheater $c$ may consist of a number of parallel connected lengths of pipes $c^3$, and these pipes may be set horizontally as illustrated or vertically or in inclined positions within the setting through which the heating gases pass; and means may be provided such as dampers by which the heating gases may be controlled within the furnace settings $c^1$ and $d^1$.

Similarly the reaction tubes $d$ may be disposed horizontally as illustrated or vertically or inclined, within a separate setting and the streams of preheated gas passing through the respective connected lengths of pipes $c^3$ pass respectively through the reaction tubes $d$ entering through the pipes $c^3$ at one end thereof, and after traversing the respective tubes the streams of gas discharge through the pipes $d^2$ into the hydraulic main $e$.

The preheater pipes $c^3$ may be connected together in parallel with elbow or similar fittings that may not be exposed to the heating gas, but be readily accessible from outside the setting for the purpose of periodic cleaning; and similarly the ends of the reaction tubes $d$ may be exposed at each end of the setting.

The diameter of the preheater pipes $c^3$ and the reaction tubes $d$ may be varied within wide limits to ensure the necessary time contact under the velocity of flow, but it is generally advantageous to provide the pipes $c^3$ of the preheater and the reaction tubes $d$ relatively narrow with a view to ensure the effective transmission of heat from the walls of the pipes and tubes.

Figure 1:
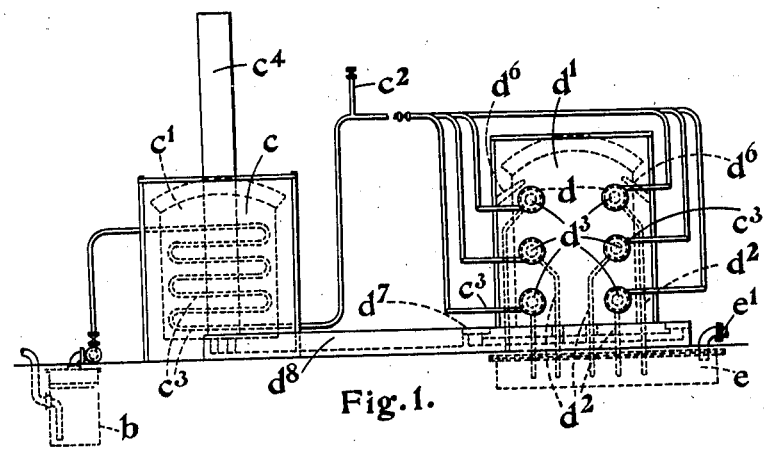
Figure 1 is an elevation of the furnace settings for the preheater and the reaction tubes respectively.

Reaction tubes $d$ (Figures 1 and 2) of silica or fire brick of an internal diameter of nine inches and of a length of ten feet have been successfully used, and preheater pipes of iron or steel of three inches in diameter connected zig-zag in lengths aggregating from 40 to 50 feet have been found effective.

The reaction tubes, conduits or passages may be packed with an inert or feebly catalytic substance such as pieces of fire brick or silica. Or again the internal surface of the reaction tubes, conduits or passages may be provided with ribs or may be otherwise formed irregularly to contribute to the turbulence of the gas in its passage through; but reaction tubes having no packing and having a smooth internal surface and of the dimensions hereinbefore indicated have been found effective under the conditions described, with a linear velocity of cool gas of from 200 to 300 feet per hour per foot heated length of the course of the gas.

In other words, the time the gases are undergoing treatment in the reaction tube or passageway may be resolved as follows: If L is the length in feet of the heated reaction passageway (tube $d^3$), then the gases if at normal atmospheric or room temperature would pass through the passageway at a linear velocity of from about $200 \times (L)$ to about $300 \times (L)$ feet per hour.

It will be understood that the gas is heated substantially uniformly in its course through the preheater pipes to a temperature substantially below that at which the gaseous paraffin hydrocarbons are decomposed. Thus the gas is for example heated in the preheater pipes to a temperature below about 550° C., and superheated steam in determined quantity may be introduced at $c^2$ into the streams of the gas before they pass into the reaction tubes $d$; and on passing through the reaction tubes the preheated gas is substantially uniformly heated to a degree within the determined range at which decomposition is effected, that is to say, if the gas treated consists mainly of methane the temperature applied within the reaction tubes is about 950° C., and if other gaseous paraffin hydrocarbons are present the temperature is determined accordingly as hereinbefore indicated.

It will be understood that by reason of the changes brought about in pyrolysis there is a consequent considerable increase in the volume of the gas, and thus low pressures are desirable. It is therefore of advantage that the working pressures should be in the neighborhood of that of the atmosphere and that the respective parts of the plant be designed and the treatment carried out accordingly.

Again, the yield of liquid products of the process has been shown by experiment to be considerably increased by the introduction of steam in the manner described, while the production of carbon is simultaneously reduced. Thus, it has been found that the addition of about 25% by volume of steam to the gas to be treated results in an increase of the liquid yield of about 100% and a decrease of the carbon produced of about from 30% to 50%.

Pyrometer contacts are provided at a number of positions in the length of the reaction tubes $d$, having regard to the necessity of precision in the application of heat, while similar provision may usefully be made in the pipes $c^3$ of the preheater.

Expansion boxes or casings $f$ of relatively large volume are provided into which the treated gas discharges on its issue through the outlet pipe $e^1$ from the hydraulic main. The gas is suddenly reduced in velocity and is cooled in the expansion boxes or casings $f$ and carbon deposits therein, the carbon deposited within the reaction tubes being reduced or avoided. For this purpose the expansion boxes or casings $f$ may have mounted within them baffles or contact surfaces or contact material, and the upward streams of gas may be sprayed with water or other liquid that may be preheated before admission, and the gas on leaving the expansion boxes or casings $f$ may have its temperature thus under control within a determined range. The treated gas is thence passed to apparatus for the recovery of the heavy tar and solids and for the recovery of the light aromatic liquid condensate. Apparatus commonly used for such purposes may be employed. Thus for example an exhauster $g$ may be provided, and the gas may thence pass to tar towers $h$ for the interception of tar and naphthalene, and thence through the condenser $i$ for the condensation of tar and lighter hydrocarbons. A filter $j$ may be provided beyond the condenser $h$ for the removal of all traces of tar fog formed in the decomposition of the gas; and a gas-oil or other absorption or scrubbing apparatus $k$ may be provided for the removal of the light vapours. The gas may leave through the outlet pipe $k^1$ for burning, and the wash oil may thence pass to a receiver $m$. The gas may however first be passed through one of two apparatus $l$ provided for alternate use each charged with activated charcoal or other adsorbent substance for the removal of any remaining light vapours from the treated gas before being passed forward for utilization.

The reaction tubes $d$ for the main part of their length are made of fire brick or silica, but the exposed ends $d^3$ of the reaction tubes, to which the pipes $c^3$ and $d^2$ are respectively connected are provided of metal, and are secured to the respective ends of the main parts of the reaction tubes with a gas tight luting.

Figure 2:
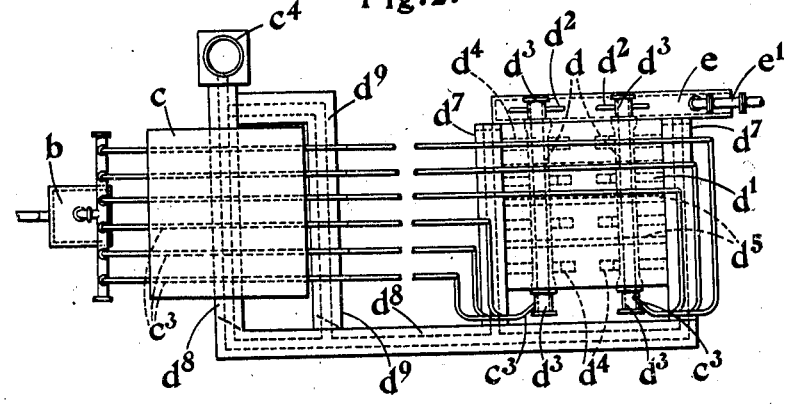
Figure 2 is a plan corresponding to Figure 1.
Figure 3:
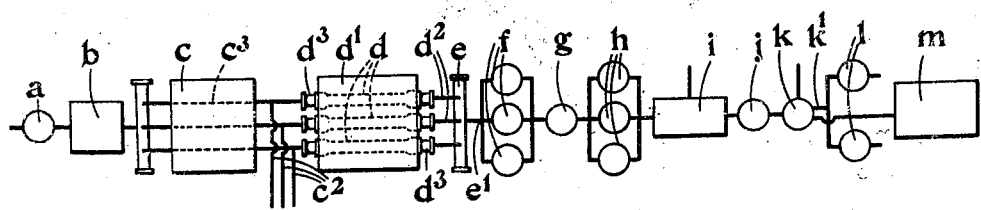
Figure 3 is a diagram of a complete plant.

The reaction tubes $d$ may as illustrated in Figure 2 be supported on transversely disposed brackets $d^4$ within the setting.

Means may be provided such as valve cocks by which the supply of gas to be treated, to any or to all of the preheater pipes and reaction tubes may be cut off, and similar provision may as usual be made for cutting out any other units of the plant.

It will be understood that the treated gas may be directly used for a variety of useful purposes, such as fuel for the heating of the reaction tubes.

It is found however that after removal of the condensible constituents in the manner described the residual gas may be used in known manner for the production of carbon black by heating the gas at high temperatures within a retort, whereby a finely divided carbon black of good colour is produced; or the residual gas may be used for the production in known manner of carbon black by combustion with a restricted supply of air.

The heating furnace in which the reaction tubes $d$ are mounted may either be heated by liquid fuel or by gas, and the gas remaining after treatment may be used as the fuel. The setting of the furnace and the disposition of the burners in relation to the reaction tubes may be varied, but the arrangement is such that heat is applied substantially uniformly to the respective reaction tubes. Thus burners $d^6$ may for example be directed upwardly towards the arch of the furnace and the heating gases may leave the furnace at the bottom through the lateral outlet flues $d^7$ and through the connected outlet flue $d^8$ the heating gases thence passing upwardly through the furnace of the preheater $c$ and discharging through the chimney $c^4$. Thus a circulation of heating gas is maintained within the furnace of the reaction tubes by which the substantially uniform application of heat to the reaction tubes is ensured and the remaining heat of the heating gases may be effectively utilized in preheating the gas to be treated in its passage through the preheating pipes. An alternative branch flue $d^9$ may be provided for direct discharge to the chimney $c^4$ of part of the heating gas under control of valves or dampers. A number of partition walls $d^5$ may extend across the furnace setting by which a number of chambers or flues are formed, the heating gases passing upwardly through these chambers and in contact with the reaction tubes. The air used for combustion in the respective furnaces may also be preheated by passage through flues adjacent the fuel-gas flue, the outlet flue or the combustion chamber or in any other position for the utilization of waste heat. Similarly fuel-gas used in either of the furnaces may similarly be preheated. Such known and usual expedients may be employed to contribute to the economy and efficiency of the process.

It will be understood that in carrying out the process a turbulent flow of the gas at a velocity such as indicated is maintained in the preheater and in the reaction tubes in order to ensure effective and uniform transmission of heat to the gas and to maintain the particles of carbon in suspension. The free carbon formed as the result of decomposition of the paraffin bodies while being deposited in the expansion boxes or casings $f$ may also to some extent be deposited in the reaction tubes; this may be removed from the reaction tubes by periodically blowing first with steam alone and then with air alone and finally with steam.

Automatic safety devices may be provided for safely changing over from gas to steam and air.

Automatic safety devices such as commonly employed may be provided on the apparatus where necessary, such as explosion hatches on the expansion boxes or casings $f$ and on the towers $h$.

The carbon-monoxide when present in the residual gas may be used with hydrogen formed during pyrolysis for the production of other organic products such as oxygenated derivatives of the hydrocarbons for example alcohols, aldehydes, ketones, organic acids and the like, and for this purpose the residual gas may be enriched to the extent required by suitable additions of hydrogen or carbon monoxide to yield such products under known process conditions; It will be understood that the products of the pyrolysis may be used as liquid and gaseous fuel or for any other useful purpose such as intermediates in the production of chemicals, solvents, etc. and that the gas may be used for the production of carbon black under conditions of restricted air supply in known manner.

Thus the olefines formed may be used for alcohol or ester production, while the liquid aromatics and heavier olefines may be used in the production of anti-detonating motor spirit.

When using natural gas containing hydrogen sulphide the gas is advantageously treated for its removal as hereinbefore indicated by any effective method such as by limited oxidation with air or sulphur dioxide at about 250 to 300° C., whereby elemental sulphur may be recovered before the gas is treated in the manner hereinbefore described, but any other method of purification or sulphur recovery may be employed. The gas is advantageously passed through a meter on admission.

As an example of the carrying out of the process on a small scale, it has been found that 1,000 cubic feet of gas containing gaseous paraffins, and of specific gravity (air=1) of 1.69 gave on thermal treatment at 800° C. in the manner described and in the presence of about 25% by volume of steam, 1.75 gals. light spirit (sp. gr. 0.875 at 60° F., F. B. P. 140° C.) 0.64 gals. tar (sp. gr. 1.09 at 60° F.), approximately 2,500 cubic feet of gas (sp. gr. 0.5) together with about 9 lbs. of carbon. The spirit produced was an exceptionally close cut, consisting of about 80 per cent of liquid boiling between 79.5° and 85° C. The tar produced contained 15 to 30 per cent of aromatic liquids boiling below 150° C.

Instead of using steam any other inert gaseous diluent may be employed, but the use of steam is preferred, and especially when the residual gas is used for the production of alcohols, aldehydes and the like.

We claim:

1. A thermal process for the conversion of paraffin type hydrocarbon gases of the homologous series comprising methane, ethane, propane, butane and pentane, for the production of aromatic liquids which comprises, flowing such gases through an elongated passageway while maintaining said gases during their flow therethrough at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering the armoatic liquids therefrom.

2. A thermal process for the conversion of paraffin type hydrocarbon gases of the homologous series comprising methane, ethane, propane, butane and pentane, for the production of aromatic liquids which comprises, flowing such gases together with steam through an elongated passageway while maintaining said gases during their flow therethrough at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering the aromatic liquids therefrom.

3. A thermal process for the conversion of paraffin type hydrocarbon gases of the homologous series comprising methane, ethane, propane, butane and pentane, for the production of aromatic liquids which comprises, flowing such gases together with not less than about 25% by volume of steam through an elongated passageway while maintaining said gases during their flow therethrough at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering the aromatic liquids therefrom.

4. A thermal process for the conversion of paraffin type hydrocarbon gases of the homologous series comprising methane, ethane, propane, butane and pentane, for the production of aromatic liquids which comprises, flowing such gases through an elongated passageway under substantially atmospheric pressure while maintaining said gases during their flow therethrough at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering the aromatic liquids therefrom.

5. A thermal process for the conversion of paraffin type hydrocarbon gases of the homologous series comprising methane, ethane, propane, butane and pentane for the production of aromatic liquids which comprises, causing a stream of such gas to be gradually heated to a temperature approaching but substantially below that at which eventual decomposition of the said gases is to be carried out, then flowing the stream of pre-heated gases through an elongated passageway while maintaining said stream of gases during flow through said passageway at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering the aromatic liquids therefrom.

6. A thermal process for the conversion of paraffin type hydrocarbon gases of the homologous series comprising methane, ethane, propane, butane and pentane for the production of aromatic liquids which comprises, causing a stream of such gas to be gradually heated to a temperature approaching but substantially below that at which eventual decomposition of the said gases is to be carried out, then flowing the stream of pre-heated gases together with steam through an elongated passageway while maintaining said stream of gases during flow through said passageway at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering the aromatic liquids therefrom.

7. A thermal process for the conversion of paraffin type hydrocarbon gases of the homologous series comprising methane, ethane, propane, butane and pentane for the production of aromatic liquids which comprises, causing a stream of such gases to be gradually heated to a temperature approaching but substantially below that at which eventual decomposition of the said gases is to be carried out, then flowing the stream of pre-heated gases together with not less than 25% by volume of steam through an elongated passageway while maintaining said stream of gases during flow through said passageway at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering the aromatic liquids therefrom.

8. A thermal process for the conversion of paraffin type hydrocarbon gases of the homologous series comprising ethane, propane and butane, for the production of aromatic liquids, which comprises flowing such gases through an elongated passageway while heating said gases during their flow therethrough to a temperature not varying more than 50° C. from a temperature of T (° C.) as substantially defined by the relation T (° C.) equals $$(A \times 850° C. + B \times 800° C. + C \times 750° C.)/(A+B+C),$$

where A, B, and C represent respectively the amounts of ethane, propane and butane in said gases, said gases being passed through said passageway at a linear velocity such that if the gases were at a normal cool temperature they would flow at a linear velocity of from about $200 \times (L)$ to about $300 \times (L)$ feet per hour where (L) is the length of said passageway in feet, and thereafter cooling the heated products from said passageway and recovering the aromatic liquids therefrom.

9. A thermal process for the conversion of paraffin type hydrocarbon gases of the homologous series comprising ethane, propane and butane, for the production of aromatic liquids, which comprises flowing such gases through an elongated passageway while heating said gases during their flow therethrough to a reaction temperature not varying more than 50° C. from a temperature of T (° C.) as substantially defined by the relation T (° C.) equals $$(A \times 850° C. + B \times 800° C. + C \times 750° C.)/(A+B+C),$$

where A, B, and C represent respectively the amounts of ethane, propane and butane in said gases, while preheating said gases prior to their introduction into said passageway to a temperature approaching but substantially below the said reaction temperature maintained on the gases flowing through said passageway, said gases being passed through said passageway at a linear velocity such that if the gases were at a normal cool temperature they would flow at a linear velocity of from about $200 \times (L)$ to about $300 \times (L)$ feet per hour where (L) is the length of said passageway in feet, and thereafter cooling the heated products from said passageway and recovering the aromatic liquids therefrom.

10. A thermal process for the conversion of paraffin type hydrocarbon gases of the homologous series comprising ethane, propane and butane, for the production of aromatic liquids, which comprises flowing such gases through an elongated passageway while heating said gases during their flow therethrough to a temperature not varying more than 50° C. from a temperature of T (° C.) as substantially defined by the relation T (° C.) equals $$(A \times 850° C. + B \times 800° C. + C \times 750° C.)/(A+B+C),$$

where A, B, and C represent respectively the amounts of ethane, propane and butane in said gases, said gases being passed through said passageway at a linear velocity, such that if the gases were at a normal cool temperature they would flow at a linear velocity of from about $200 \times (L)$ to about $300 \times (L)$ feet per hour where (L) is the length of said passageway in feet, cooling the heated products from said passageway substantially immediately subsequent to their exit therefrom by direct contact with a heat absorbing liquid, and recovering the aromatic liquids therefrom.

11. A thermal process for the conversion of paraffin type hydrocarbon gases of the homologous series comprising ethane, propane and butane, for the production of aromatic liquids, which comprises flowing such gases through an elongated passageway while heating said gases during their flow therethrough to a temperature not varying more than 50° C. from a temperature of T (° C.) as substantially defined by the relation T (° C.) equals $$(A \times 850° C. + B \times 800° C. + C \times 750° C.)/(A+B+C),$$

where A, B, and C represent respectively the amounts of ethane, propane and butane in said gases, said gases being passed through said passageway at a linear velocity such that if the gases were at a normal cool temperature they would flow at a linear velocity of from about $200 \times (L)$ to about $300 \times (L)$ feet per hour where (L) is the length of said passageway in feet, cooling the heated products from said passageway approximately directly subsequent to their exit therefrom by direct contact with water, and recovering the aromatic liquids therefrom.

12. A thermal process for the conversion of paraffin type hydrocarbon gases of the homologous series comprising methane, ethane, propane, butane and pentane, for the production of aromatic liquids which comprises, flowing such gases through an elongated passageway while maintaining said gases during their flow therethrough at a temperature between about 650° and 950° C., said gases being passed through said passageway at such a linear velocity that if the gases were at a normal low temperature they would flow at a linear velocity of from about 200 to about 300 feet per hour per linear foot of said passageway, and suddenly cooling the heated products from said passageway, substantially immediately subsequent to their exit therefrom by directly contacting them with a heat absorbing liquid and recovering aromatic liquids from the cooled products.

13. A thermal process for the conversion of ethane gas for the production of aromatic liquids which comprises flowing such gas through an elongated passageway while heating it during its flow therethrough to a temperature between about 800° C. and about 900° C. while passing it therethrough at a linear velocity such that if the gases were at a normal cool temperature they would flow at a linear velocity of from about 200×(L) to about 300×(L) feet per hour where (L) is the length of said passageway in feet, and thereafter cooling the heated products from said passageway and recovering the aromatic liquids therefrom.

14. A thermal process for the conversion of propane gas for the production of aromatic liquids which comprises flowing such gas through an elongated passageway while heating it during its flow therethrough to a temperature between about 750° C. and about 850° C. while passing it therethrough at a linear velocity such that if the gases were at a normal cool temperature they would flow at a linear velocity of from about 200×(L) to about 300×(L) feet per hour where (L) is the length of said passageway in feet, and thereafter cooling the heated products from said passageway and recovering the aromatic liquids therefrom.

15. A thermal process for the conversion of butane gas for the production of aromatic liquids which comprises flowing such gas through an elongated passageway while heating it during its flow therethrough to a temperature between about 700° C. and about 800° C. while passing it therethrough at a linear velocity such that if the gases were at a normal cool temperature they would flow at a linear velocity of from about 200×(L) to about 300×(L) feet per hour where (L) is the length of said passageway in feet, and thereafter cooling the heated products from said passageway and recovering the aromatic liquids therefrom.

16. A thermal process for the conversion of paraffin type hydrocarbon gases of the homologous series comprising methane, ethane, propane, butane and pentane, for the production of aromatic liquids which comprises, flowing such gases through an elongated passageway while maintaining said gases during their flow therethrough at a temperature between about 650° and 950° C., said gases being passed through said passageway at such a linear velocity that if the gases were at a normal low temperature they would flow at a linear velocity of from about 200 to about 300 feet per hour per linear foot of said passageway, the said velocity being sufficient that the gases are in a turbulent state during their passage through said passageway, and thereafter cooling the heated products and recovering the aromatic liquids therefrom.

17. A thermal process for the conversion of paraffin type hydrocarbon gases of the homologous series comprising ethane, propane, and butane, for the production of aromatic liquids, which comprises flowing such gases through an elongated passageway while heating said gases during their flow therethrough to a temperature not varying more than 50° C. from a temperature of T (° C) as substantially defined by the relation T (° C.) equals $$(A \times 850° C. + B \times 800° C. + C \times 750° C.) / (A+B+C),$$

where A, B, and C represent respectively the amounts of ethane, propane and butane in said gases, said gases being passed through said passageway at a linear velocity such that if the gases were at a normal cool temperature they would flow at a linear velocity of from about 200×(L) to about 300×(L) feet per hour where (L) is the length of said passageway in feet, the said velocity being sufficient that the gases are in a turbulent state during their passage through said passageway, and thereafter cooling the heated products from said passageway and recovering the aromatic liquids therefrom.

18. A thermal process for the conversion of paraffin type normally gaseous materials which comprises flowing such gases through an elongated passageway while maintaining them during their flow therethrough at a temperature between about 650° and 950° C., said gases being passed through said passageway at such a linear velocity that if the gases were at a normal low temperature they would flow at a linear velocity of from about 200 to about 300 feet per hour per linear foot of said passageway, and thereafter cooling the heated products and recovering desired products therefrom.

ALBERT ERNEST DUNSTAN.
RICHARD VERNON WHEELER.